P. E. SPITZER.
PRESSURE EQUALIZER FOR VALVES
APPLICATION FILED NOV. 30, 1914.
1,190,681.  Patented July 11, 1916.
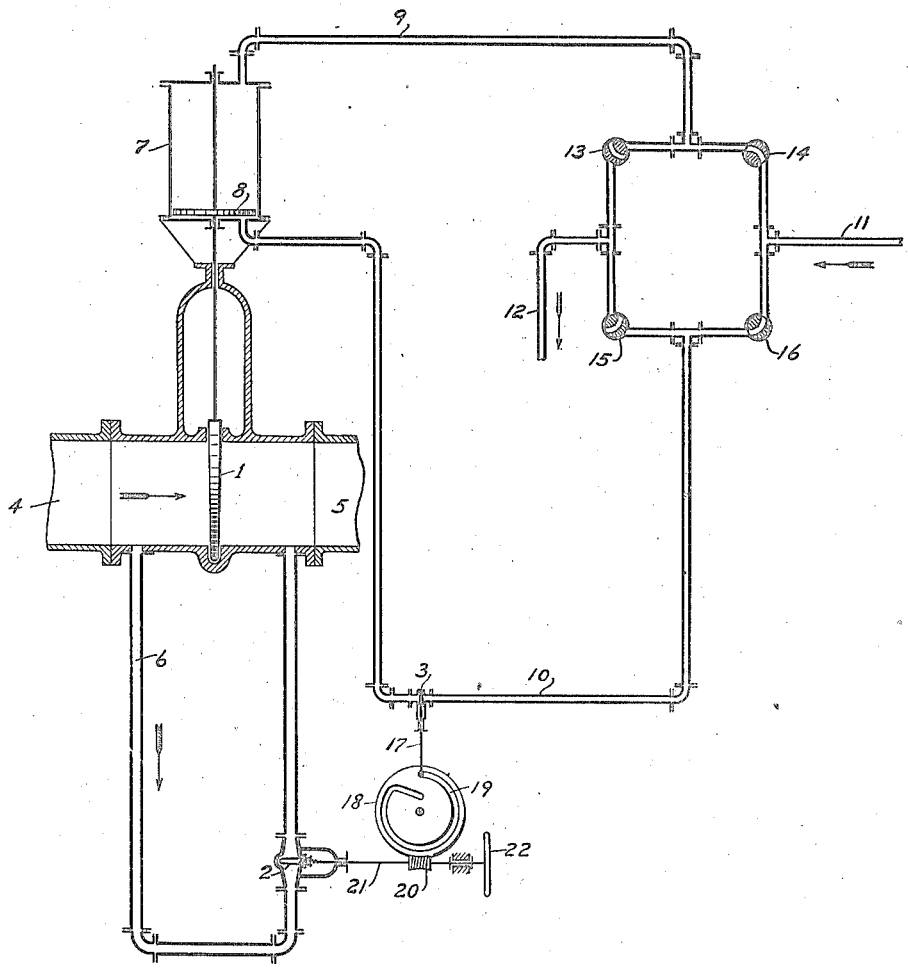

UNITED STATES PATENT OFFICE.

PURVES E. SPITZER, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

PRESSURE-EQUALIZER FOR VALVES.

1,190,681.  Specification of Letters Patent.  Patented July 11, 1916.

Application filed November 30, 1914. Serial No. 875,190.

*To all whom it may concern:*

Be it known that PURVES E. SPITZER, a citizen of the United States, residing at West Allis, in the county of Milwaukee and State of Wisconsin, has invented a certain new and useful Improvement in Pressure-Equalizers for Valves, of which the following is a specification.

This invention relates to improvements in devices for equalizing the pressures on opposed surfaces of valves, prior to manipulation of the valves.

An object of the invention is to provide means for balancing or equalizing the pressures on valves.

One of the more specific objects is to provide a device for equalizing the pressures on opposed surfaces of large gate valves prior to opening and closing thereof.

Another object is to provide means for positively locking large valves in either open or closed position until an open by-pass communication has been established around the valve.

A further object is to provide a mechanism which is especially applicable to the main motor actuated gate valves of hydraulic turbine installations, for preventing actuation of these valves under abnormal unbalanced pressures.

A clear conception of an embodiment of the invention may be had by referring to the drawing accompanying and forming a part of this specification in which the various parts are identified by suitable reference characters.

The single figure of the drawing is a diagrammatic sectional plan view of a gate valve and its operating mechanism, having the invention applied thereto.

The main gate 1 controls the flow of fluid under pressure from the inlet side 4 of the main pipe line to the discharge side 5 thereof. The stem of the main gate 1 is provided with a servo-motor piston 8, which is reciprocable within the servo-motor cylinder 7. The by-pass 6 connects the inlet side 4 of the main pipe line with the discharge side 5 thereof. The flow of fluid through the by-pass 6 is controlled by means of a manually operable by-pass valve 2.

The conduits or pipes 9, 10, are adapted to admit and exhaust fluid under pressure to the opposite faces of the servo-motor piston 8. The servo-motor actuating fluid under pressure is admitted from a suitable source, not shown, to the pipes 9, 10, through the conduit or pressure supply pipe 11. The servo-motor supply valves 14, 16, control the flow of fluid from the supply pipe 11 to the pipes 9, 10, respectively. The servo-motor exhaust valves 13, 15, control the exhaust of fluid from the servo-motor cylinder 7 through the pipes 9, 10, respectively. The pressure exhaust conduit or pipe 12 connects the exhaust valves 13, 15 with a suitable exhaust receptacle, not shown.

The by-pass valve 2 which controls the flow of fluid through the by-pass 6, is operable by means of a stem 21 and hand wheel 22. The stem 21 is rotatable in a stationary bearing, being fixed against longitudinal displacement, and has a screw-threaded end coacting with the valve 2. The valve stem 21 carries a worm 20 which meshes with the worm wheel 18 mounted in suitable bearings not shown. The worm wheel 18 is provided with a cam groove 19 which coacts with a roller carried by the end of the valve stem 17 of the auxiliary valve 3. The auxiliary valve 3 controls the flow of fluid through the conduit or pipe 10 to and from the servo-motor cylinder 7.

During the normal operation of the device and with the main gate 1 in closed position as shown, the inlet side of the pipe line is under pressure while the discharge side 5 may be under considerably lower pressure. With the discharge side 5 under lower pressure, it will be noted that upon operation of the main gate 1, the seating surfaces between the main gate 1 and its casing on the discharge side 5, will be subjected to considerable wear. In order to prevent such wear, means are provided in the form of the by-pass 6 and by-pass valve 2, for permitting equalization of the pressures in the opposite sides 4, 5, of the main pipe line. If the by-pass valve 2 is opened by means of the hand wheel 22, fluid under pressure passes from the side 4 through the by-pass 6 to the side 5 of the main pipe line and eventually establishes substantially equal pressures on opposite sides of the main gate 1.

With the device in the position shown, if it is desired to open the main valve 1, the supply valve 14 should first be closed and the exhaust valve 13 opened, the supply valve 16 and exhaust valve 15 being properly positioned as shown. After proper positioning of the supply and exhaust valves 14, 13, the by-pass valve 2 is gradually opened by rotation of the valve stem 21. As the rotating valve stem 21 operates the worm 20, the worm wheel 18 is rotated in an anticlockwise direction as viewed in the figure, until the abrupt bend in the cam groove 19 is reached. By this time the by-pass valve 2 will have been almost fully opened and the pressure on opposite sides of the main gate 1 will have been substantially equalized. Upon further rotation of the stem 21, worm 20 and worm wheel 18, the roller at the end of the auxiliary valve stem 17 rides along the inwardly extending portion of the cam groove 19 and causes the auxiliary valve 3 to suddenly open and to permit fluid under pressure to flow from the pressure inlet pipe 11 through the valve 16 and pipe 10 to the chamber below the servo-motor piston 8. The admission of fluid under pressure to the lower face of the piston 8 causes the piston and the main gate 1 to move upwardly to open the main gate and to establish direct communication between the sides 4, 5, of the pipe line. During opening movement of the main gate 1, the fluid in the upper chamber of the cylinder 7 is forced through the pipe 9, valve 13 and pipe 12 to the exhaust.

If it is desired to close the main valve 1, the pressure supply valve 14 should be opened and the exhaust valve 13 closed as shown, while the pressure supply valve 16 should be closed and the exhaust valve 15 opened. If the by-pass valve 2 is open at the time it is desired to close the main valve 1, the proper setting of the valves 13, 14, 15, 16, will automatically cause the main gate 1 to close. If, however, the by-pass valve 2 is closed at the time closing of the main gate 1 is desired, the auxiliary valve 3 will also be closed as shown, and the fluid confined below the servo-motor piston 8 will not be permitted to escape to exhaust. The by-pass valve 2 must therefore be opened before closing of the main gate 1 is permitted, opening of the by-pass valve resulting in opening of the auxiliary valve 3 and in the establishment of free communication between the servo-motor and exhaust through the pipe 10, valve 15 and pipe 12.

It will thus be noted that the main gate 1 cannot be either opened or closed until after the by-pass valve 2 has been opened, thus insuring establishment of substantially equal pressures in the sides 4, 5, of the main pipe during manipulation of the main gate 1. This equalization of the pressures eliminates the excessive wear on the valve seat which would result from having the main gate operated under abnormal unbalanced pressures. The auxiliary valve 3, which is controlled by the by-pass valve 2, forms means for positively locking the main gate 1 and servo-motor piston 8 against movement in either direction.

While the by-pass valve 2 is shown as being manually operable, it should of course be understood that this showing is merely illustrative and that any other method of operating may be employed. The arrangement of actuating the auxiliary valve 3 is also merely one of many arrangements which might be employed to accomplish the same result.

It should be understood that it is not desired to be limited to the exact details of construction shown and described, for obvious modifications will occur to a person skilled in the art.

It is claimed and desired to secure by Letters Patent,—

1. In combination, a main valve, means for equalizing the pressure on opposite sides of said main valve, pressure operated means for actuating said main valve, and means for positively preventing admission of pressure to said operating means for actuation of said main valve when the pressures on opposite sides of said main valve are not equalized.

2. In combination, a main valve, means for equalizing the pressures on opposite sides of said main valve, pressure operated means for actuating said main valve, and means operable by said equalizing means for positively preventing admission of pressure to said operating means for actuation of said main valve.

3. In combination, a main valve, means for equalizing the pressures on opposite sides of said main valve, pressure operated means for actuating said main valve, and means for positively preventing admission of pressure to said operating means to open said main valve when the pressures on opposite sides of said valve are not equalized.

4. In combination, a main valve, a by-pass valve, pressure operated means for actuating said main valve, and means for positively preventing admission of pressure to said operating means for actuation of said main valve when said by-pass valve is closed.

5. In combination, a main valve, a by-pass around said main valve, a hydraulic servo-motor for actuating said main valve, an auxiliary valve for positively preventing admission of pressure to said operating means for actuation of said main valve, and means for locking said auxiliary valve in closed position until after said by-pass has been opened.

6. In combination, a main valve, a by-pass valve, pressure operated means for actuating said main valve, and an auxiliary valve operable by said by-pass valve for positively preventing admission of pressure to said means for actuation of said main valve.

7. In combination, a main valve, means for equalizing the pressures on opposite sides of said main valve, pressure operated means for actuating said main valve, and means operable by said equalizing means for positively preventing admission of pressure to said operating means for operation of said main valve when said main valve is closed.

8. In combination, a main valve, a by-pass, a valve for controlling the flow of fluid through said by-pass, a hydraulic servo-motor for actuating said main valve, an auxiliary valve for positively preventing admission of liquid to said servo-motor to open said main valve, and means for locking said auxiliary valve in closed position until after said by-pass valve has been opened.

In testimony whereof, the signature of the inventor is affixed hereto in the presence of two witnesses.

PURVES E. SPITZER.

Witnesses:
W. H. LIEBER,
J. J. KANE.